US008215622B2

(12) United States Patent
Fukui et al.

(10) Patent No.: US 8,215,622 B2
(45) Date of Patent: Jul. 10, 2012

(54) CLAMP DEVICE

(75) Inventors: Chiaki Fukui, Abiko (JP); Kazuyoshi Takahashi, Koto-ku (JP); Atsushi Tamai, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 778 days.

(21) Appl. No.: 12/375,155

(22) PCT Filed: Jul. 25, 2007

(86) PCT No.: PCT/JP2007/064550

§ 371 (c)(1),
(2), (4) Date: Jan. 26, 2009

(87) PCT Pub. No.: WO2008/015936

PCT Pub. Date: Feb. 7, 2008

(65) Prior Publication Data

US 2009/0283948 A1 Nov. 19, 2009

(30) Foreign Application Priority Data

Jul. 31, 2006 (JP) ................................ 2006-208905

(51) Int. Cl.
*B23Q 3/08* (2006.01)
*B25B 1/14* (2006.01)
*B25B 5/12* (2006.01)
*B25B 1/02* (2006.01)
*B25B 5/02* (2006.01)

(52) U.S. Cl. .............. 269/32; 269/24; 269/27; 269/228; 269/201; 269/20

(58) Field of Classification Search .................... 269/32, 269/24, 27, 228, 201, 20
See application file for complete search history.

(56) References Cited

U.S. PATENT DOCUMENTS

| | | | | |
|---|---|---|---|---|
| 5,996,984 | A * | 12/1999 | Takahashi | 269/32 |
| 6,065,743 | A | 5/2000 | Roudier et al. | |
| 6,220,588 | B1 * | 4/2001 | Tunkers | 269/32 |
| 6,540,217 | B2 | 4/2003 | Takahashi et al. | |
| 6,557,841 | B2 | 5/2003 | Dellach et al. | |
| 6,612,557 | B2 | 9/2003 | Sawdon et al. | |
| 6,997,447 | B2 | 2/2006 | Fukui | |
| 7,265,287 | B2 | 9/2007 | Shimada | |
| 2004/0041324 | A1 * | 3/2004 | Fukui | 269/32 |

FOREIGN PATENT DOCUMENTS

| | | |
|---|---|---|
| DE | 198 24 579 | 6/1999 |
| DE | 200 04 406 U1 | 7/2000 |
| FR | 2769 255 | 4/1999 |
| JP | 2002 59294 | 2/2002 |
| JP | 2004 90163 | 3/2004 |
| JP | 2006 33373 | 2/2006 |
| JP | 2006 184856 | 7/2006 |
| SU | 663528 | 5/1979 |

* cited by examiner

*Primary Examiner* — Monica Carter
*Assistant Examiner* — Nirvana Deonauth
(74) *Attorney, Agent, or Firm* — Oblon, Spivak, McClelland, Maier & Neustadt, L.L.P.

(57) ABSTRACT

A clamp device including a detection mechanism provided to detect whether the clamp device is in a clamped state or an unclamped state. The detection mechanism includes a tilt plate tiltably placed inside a switch holder installed on a body and a sliding rod displaced together with a piston rod and displaced in the direction normal to the tilt plate. When the sliding rod presses and tilts the tilt plate while a piston is displaced, a second detection switch detects that the clamp device is in the unclamped state.

7 Claims, 8 Drawing Sheets

CLAMP DEVICE

TECHNICAL FIELD

The present invention relates to a clamp apparatus, which is capable of clamping a workpiece through a clamp arm rotated a predetermined angle under a displacement action of a piston.

BACKGROUND ART

Heretofore, for example, when a constituent element of an automobile or the like is welded, a clamp apparatus has been used in order to clamp the constituent element. Such a clamp apparatus includes a main body, a cylinder connected to the main body, and a clamp arm, which is rotated a predetermined angle, under a driving action of the cylinder, through a toggle link mechanism disposed inside of the main body. In addition, by displacing a piston and piston rod of the cylinder in an axial direction by means of a pressure fluid supplied to the cylinder, via the toggle link mechanism connected to the piston rod, the clamp arm is rotated through an operating angle based on the displacement amount of the piston. As a result, switching can occur between a clamped state, in which the workpiece can be clamped, and an unclamped state in which the clamped state of the workpiece is released.

On the other hand, with the aforementioned clamp apparatus, there is frequently a desire to arbitrarily adjust the operating angle of the clamp arm, for example, corresponding to the state under which the clamp apparatus is used. For this purpose, a clamp apparatus is known having an angle adjusting mechanism, which is capable of adjusting the operating angle of the clamp arm.

As one type of angle adjusting mechanism for a clamp apparatus, as disclosed in the specification of French Patent Application No. 9712535, a sub-rod is threadedly engaged with a piston rod connected to a piston, wherein a toggle link mechanism is connected with respect to the sub-rod. In addition, by threaded rotation of the sub-rod with respect to the piston rod, the length of the piston rod and sub-rod is made freely adjustable, wherein based on displacement of the piston rod, the operating angle of the rotating clamp arm is adjusted.

Further, in the angle adjusting mechanism of the clamp apparatus disclosed in U.S. Pat. No. 6,557,841 B2, a plurality of grooves, separated at equal intervals, are formed on the outer circumferential surface of the sub-rod disclosed by the aforementioned French Patent Application No. 9712535. After the sub-rod has been displaced along the piston rod for adjusting the length of the piston rod and sub-rod, an engaging ring engaging with the piston rod engages within the grooves for regulating displacement of the piston rod and the sub-rod, thereby integrally fixing the piston rod and the sub-rod to each other.

Further, in the angle adjusting mechanism of the clamp apparatus disclosed in U.S. Pat. No. 6,612,557 B2, a structure is provided in which threads are engraved along the outer circumferential surface of the piston rod connected to the piston, wherein the threads of the piston rod are screw-engaged with an inner part of a tubular member connected with the toggle link mechanism. Further, by threaded rotation of a rod screw, which is exposed on an outer body portion, the overall length of the piston rod and the tubular member can be adjusted.

Still further, in an angle adjustment mechanism of a clamp apparatus, as disclosed in German Patent Document No. 19824579 C1, a displaceable head cover is provided in the interior of a cylinder, wherein during unclamping, displacement of the piston can be regulated through the head cover. In addition, a displacement amount of the piston is regulated by first displacing the head cover freely along the cylinder, and then fixing the position of the head cover by an adjustment bolt, for thereby adjusting the operating angle of the clamp arm that is rotated by a displacement action of the piston.

However, in the techniques disclosed in the aforementioned French Patent Application No. 9712535 and U.S. Pat. No. 6,557,841 B2, when the operating angle of the clamp arm is adjusted, it is necessary that the sub-rod and tubular member disposed inside the cylinder be screw-rotated or engaged by means of an engagement ring onto the piston rod. As a result, in the case that an angular adjustment of the clamp arm is performed, the clamp apparatus must first be dismantled, whereupon the adjustment operation is carried out, and hence the angular adjustment operation is extremely complicated. Further, it is impossible to perform the adjustment operation while confirming the operating angle of the clamp arm.

Furthermore, in the technique according to U.S. Pat. No. 6,557,841 B2, since the sub-rod cannot be locked with respect to the piston rod except at the position of the grooves, the length of the piston rod and sub-rod cannot be set arbitrarily. As a result, the adjustable range for the operating angle of the clamp arm is limited.

Further, in the technique disposed in U.S. Pat. No. 6,612,557 B2, a structure is provided whereby the angle of the clamp arm is adjustable from the exterior. However, since a mechanism for regulating rotation of the rod screw is not provided, after an adjustment is performed by means of the rod screw, there remains a concern that the rod screw may be rotated in error, thus altering the set angle that was adjusted.

On the other hand, in the technique disclosed by German Patent Document No. 19824579 C1, a switch that detects the operating angle of the clamp arm is installed in the head cover. Owing thereto, when the head cover is displaced, the switch is displaced integrally with the head cover, accompanied by movement of the lead wires connected to the switch. As a result, it is necessary for the length of the lead wires to be set longer beforehand, which tends to be troublesome.

DISCLOSURE OF THE INVENTION

An object of the present invention is to provide a clamp apparatus capable of adjusting the operating angle of a clamp arm easily and effectively to a desired amount, wherein the positioning of a detection mechanism in the clamp apparatus is not moved.

According to the present invention, a clamp apparatus is provided in which linear movement of a cylinder is converted to rotational movement by a toggle mechanism, for clamping a workpiece through a clamp arm, the clamp apparatus comprising:

a main body;

a cylinder connected to the main body and having a piston therein displaceable in an axial direction under a pressing action of a pressure fluid;

an adjustment mechanism disposed so as to be displaceable within the cylinder, which is capable of regulating displacement of the piston and of adjusting a stroke displacement amount of the piston; and a detection mechanism for detecting clamped and unclamped states of the workpiece based on the stroke displacement amount of the piston, wherein at least a portion of the adjustment mechanism is exposed on the exterior of the cylinder, and an operating angle of the clamp arm is adjusted based on the stroke displacement amount of the piston, as adjusted by the adjustment mechanism.

In this manner, the adjustment mechanism, which is capable of adjusting the stroke displacement amount of the piston, is displaceably disposed with respect to the cylinder, and a portion of the adjustment mechanism is exposed to the exterior. In addition, by displacing the adjustment mechanism and thereby adjusting the displacement amount of the piston, the operating angle of the clamp arm, which is rotatably displaced accompanying displacement of the piston, can be adjusted. Together therewith, clamped and unclamped states of the workpiece by the clamp arm are detected by means of the detection mechanism.

Accordingly, because the adjustment mechanism is disposed in the cylinder such that at least a portion thereof is exposed to the exterior, the displacement amount of the piston can freely be adjusted by the adjustment mechanism from the exterior of the clamp apparatus. As a result, when the operating angle of the clamp arm is adjusted, complex operations of dismantling the clamp apparatus each time adjustments are made, as in the clamp apparatus having the angular adjustment mechanism of the conventional technique, are not necessary. Thus, operating angle adjustment operations can easily and effectively be carried out. Further, such adjustment operations can be carried out while confirming the operating angle of the clamp arm.

Moreover, since the stroke displacement amount of the piston can be adjusted freely by the adjustment mechanism, the operating angle of the clamp arm, which rotates based on displacement of the piston, can be adjusted to a desired amount.

Furthermore, even in cases where the piston displacement amount is freely adjusted by the adjustment mechanism, reliable detection is possible by means of the detection mechanism, such that even when the stroke displacement amount of the piston is varied, clamped and unclamped states of the workpiece can reliably be confirmed.

Further, the adjustment mechanism is formed by an adjustment bolt facing the piston, which is displaceable in directions that approach and separate away from the piston, wherein displacement is regulated through abutment of the piston against the adjustment bolt. As a result, by displacing the adjustment bolt in directions that approach and separate away from the piston, a displacement amount of the piston, displacement of which is regulated through abutment of the piston against the adjustment bolt, can also be freely adjusted. Owing thereto, it is possible to freely adjust the operating angle of the clamp arm, which is moved rotatably accompanying a stroke displacement of the piston.

Furthermore, by screw-engagement of a lock nut, which regulates displacement of the adjustment bolt in the axial direction, after the displacement amount of the piston has been adjusted by the adjustment bolt, further displacement of the adjustment bolt can be prevented by the lock nut. As a result, mistaken displacements of the adjustment bolt do not occur, and the operating angle of the clamp arm, which has been adjusted by means of the adjustment bolt, can be reliably and suitably maintained.

Still further, the detection mechanism may be equipped with:

a first rod disposed displaceably inside the piston rod connected to the piston, the first rod being displaced together with the piston rod, and further wherein the first rod is biased toward a side of the adjustment mechanism under a resilient action of a resilient member;

a second rod substantially perpendicular to the first rod, which is inserted displaceably inside the piston rod and engages with the first rod;

a detection plate disposed substantially in parallel with the first rod, the detection plate being tiltably displaceable, with a fixed end thereof serving as a fulcrum, under a displacement action of the second rod and by being pressed by the second rod; and a sensor disposed adjacent to the detection plate, which detects a tilting displacement of the detection plate.

As a result, when the piston is displaced toward the adjustment mechanism, the first rod is displaced toward a side of the second rod in opposition to the resilient force of the resilient member, whereupon the second rod is displaced toward a side of the detection plate through an engagement action of the first rod. In addition, as a result of the tilting displacement of the detection plate, with a fixed end of the detection plate serving as a fulcrum, such tilting displacement is detected by the sensor, and therefore, the unclamped state of the clamp arm, which is rotationally displaced based on displacement of the piston, can be confirmed by the sensor.

Further, the first rod includes a first inclined part inclined at a predetermined angle facing the second rod, and the second rod includes a second inclined part inclined at a predetermined angle facing the first rod, the second inclined part abutting against the first inclined part, wherein a displacement direction of the first rod is transmitted to the second rod perpendicularly thereto through the first and second inclined parts.

As a result, when the first rod is displaced toward the second rod, the second inclined part is pressed by the first inclined part of the first rod, and the displacement direction of the first rod is converted in a substantially perpendicular direction to displacement of the second rod. Owing thereto, under a displacement action of the first rod, the detection plate, which is disposed substantially parallel to the first rod, is suitably pressed by the second rod and can be tiltably displaced thereby.

BEST MODE FOR CARRYING OUT THE INVENTION

Figure 1:
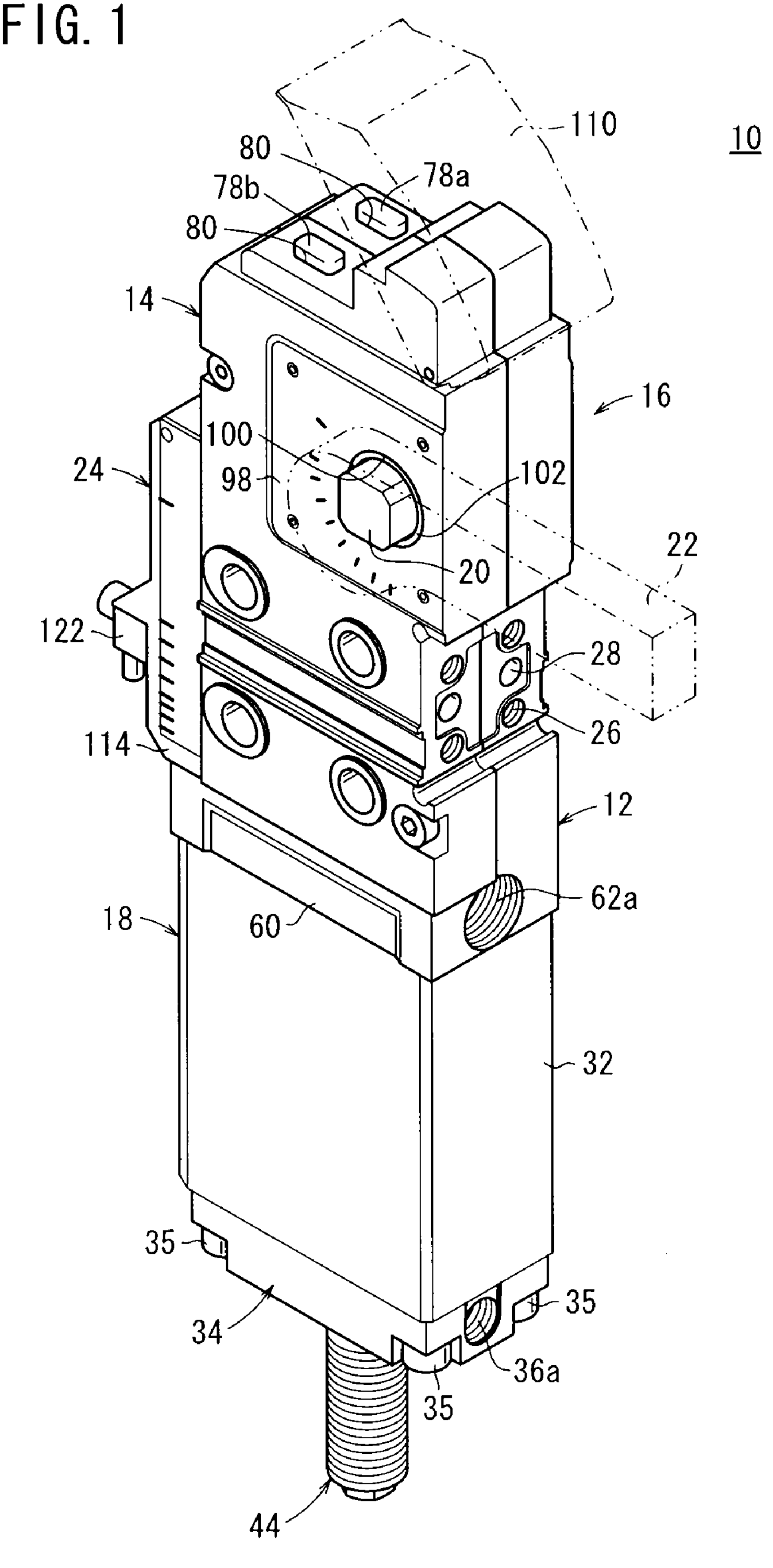
FIG. 1 is an exterior perspective view showing a clamp apparatus according to an embodiment of the present invention.
Figure 2:
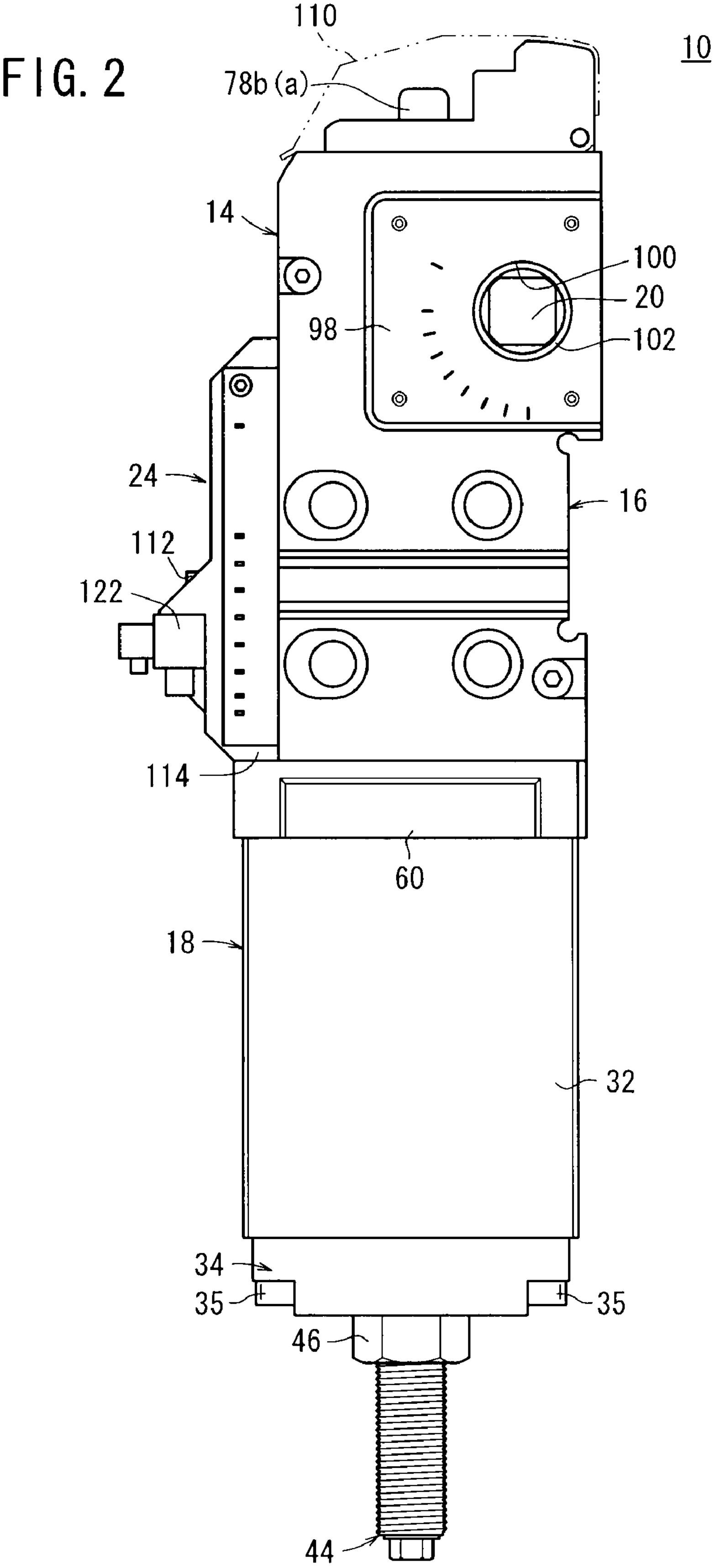
FIG. 2 is a front elevational view showing the clamp apparatus of FIG. 1.
Figure 3:
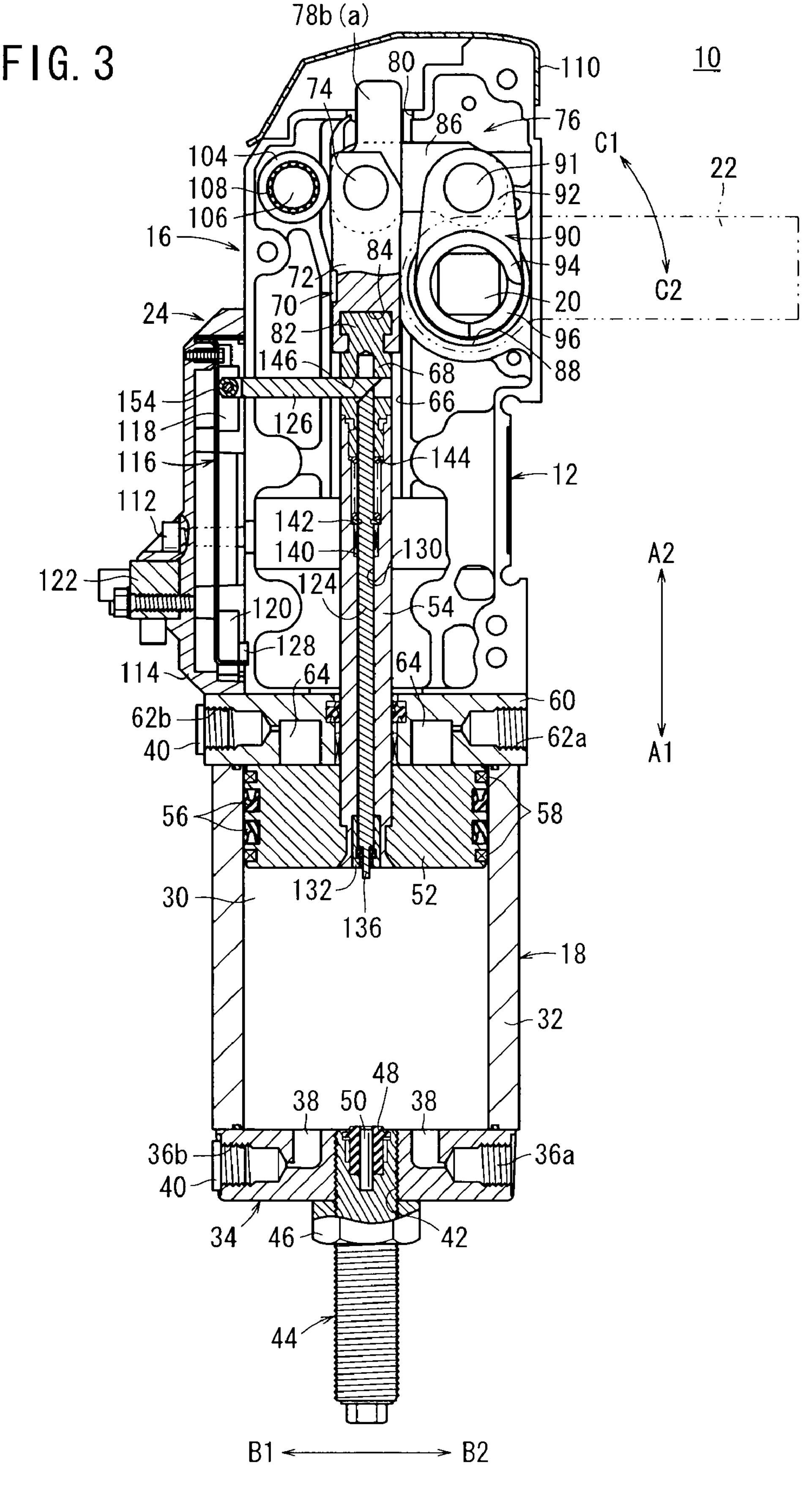
FIG. 3 is a vertical sectional view, with partial omission, showing the clamp apparatus of FIG. 1.

The clamp apparatus 10, as shown in FIGS. 1 to 3, includes a body (main body) 16 formed with a flattened shape from first and second casings 12, 14, a cylinder 18 connected to a lower end of the body 16, an arm (clamp arm) 22 connected to a rectangular bearing 20 projecting from the body 16 to the exterior thereof, and a detection mechanism 24 disposed on a side of the body 16 that detects a clamped state and an unclamped state of a workpiece (not shown) by the arm 22.

A plurality of fixing holes 26 into which unillustrated fixing screws are threaded for assembling the clamp apparatus 10 onto another member, and plural position determining holes 28 into which positioning pins (not shown) are inserted for setting the position of the clamp apparatus 10 when the clamp apparatus 10 is assembled, are formed on a side surface of the body 16.

The cylinder 18 is formed with a hollowed shape and includes a cylinder tube 32 having a cylinder chamber 30 (see FIG. 3) on the inside thereof, and an end block 34 connected to an end of the cylinder tube 32 and closing the cylinder chamber 30. Penetrating holes (not shown) penetrating in the axial direction are formed at four corners of the cylinder tube 32 and the end block 34, wherein connecting bolts 35 (see FIGS. 1 and 2) are inserted and fastened respectively in the penetrating holes. The end block 34 and the cylinder tube 32 are connected integrally with respect to the body 16 by the connecting bolts 35.

A pair of first fluid inlet/outlet ports 36*a*, 36*b*, through which a pressure fluid (for example, compressed air) is introduced and discharged, is formed on side surfaces of the end block 34. The first fluid inlet/outlet ports 36*a*, 36*b* communicate respectively with the cylinder chamber 30 through communication passages 38 (see FIG. 3). The first fluid inlet/outlet ports 36*a*, 36*b* are positioned on the opposite side surfaces of the end block 34 substantially symmetrically with respect to the axis of the end block 34. Moreover, the pair of first fluid inlet/outlet ports 36*a*, 36*b* may be used by selecting either one of the first fluid inlet/outlet ports 36*a*, 36*b*, for example, wherein the other unused first fluid inlet/outlet port 36*b* is closed by a plug 40 (see FIG. 3).

Further, an adjustment bolt (adjustment mechanism) 44, which is capable of adjusting a rotational angle (operating angle) of the arm 22 through a screw hole 42 that penetrates in the axial direction, is threadedly inserted substantially centrally into the end block 34, wherein a lock nut 46 is screw-engaged on an outer periphery of the adjustment bolt 44. Together with displacement of the adjustment bolt 44 by threaded rotation in the axial direction (the direction of the arrows A1 and A2) of the cylinder tube 32, the lock nut 46 is threadedly rotated, such that displacement of the adjustment bolt 44 is regulated by abutment of the lock nut 46 against an end surface of the end block 34.

Further, a cylindrical damper 48 formed of a rubber material such as urethane rubber or the like is installed on an end of the adjustment bolt 44 facing the cylinder chamber 30. A stopper pin 50 is inserted and fitted substantially centrally in the damper 48. An end surface of the stopper pin 50 is disposed so as to be recessed inwardly just slightly with respect to an end surface of the damper 48.

A piston 52 is disposed inside the cylinder tube 32 displaceably along the cylinder chamber 30, wherein one end of a piston rod 54 is connected to a center portion of the piston 52, so as to be displaceable integrally therewith. A pair of piston packings 56 and sealing rings 58 are installed respectively via annular grooves on an outer circumferential surface of the piston 52. In this case, the piston 52 is displaced in a direction (the direction of the arrow A1) away from the body 16 and abuts against the damper 48 disposed on the adjustment bolt 44. As a result, displacement of the piston 52 is regulated at a displacement terminal end position (lower limit position), and shocks generated upon abutment of the piston 52 are buffered by the damper 48.

Further, in this case, by turning the adjustment bolt 44 and displacing the adjustment bolt 44 axially (in the directions of the arrows A1 and A2) with respect to the end block 34, the axial displacement amount (stroke amount) of the piston 52 that abuts against the adjustment bolt 44 via the damper 48 can be arbitrarily adjusted. That is, the adjustment bolt 44 functions as a displacement adjustment mechanism, which is capable of adjusting the displacement amount of the piston 52.

The first casing 12 and the second casing 14 that make up the body 16 have asymmetrical shapes, wherein the first casing 12 and the second casing 14 are assembled together integrally.

A projection 60, which projects in a substantially horizontal direction and further which functions as a rod cover, is formed integrally on a lower end of the first casing 12 (see FIG. 1). Further, the longitudinal dimension of the second casing 14 is formed so as to be shorter, compared with the first casing 12, by an amount corresponding to the thickness dimension of the projection 60.

Further, a pair of second fluid inlet/outlet ports 62*a*, 62*b* (see FIG. 3), through which a pressure fluid (for example, compressed air) is introduced and discharged, is formed on the lower end of the first casing 12 that includes the projection 60. The second fluid inlet/outlet ports 62*a*, 62*b* communicate with the cylinder chamber 30 through communication passages 64, and are arranged substantially symmetrically facing with respect to the axis of the first casing 12. Moreover, similar to the first fluid inlet/outlet ports 36*a*, 36*b*, the second fluid inlet/outlet ports 62*a*, 62*b* may be used by selecting either one of the second fluid inlet/outlet ports 62*a*, 62*b*, wherein the other unused second fluid inlet/outlet port 62*b* is closed by a plug 40.

Guide grooves 66 are formed respectively along the axial direction facing inner wall surfaces of the first casing 12 and the second casing 14. A knuckle joint 70, which is connected to another end of the piston rod 54 through a connection block 68, is disposed slidably along the guide grooves 66. That is, the knuckle joint 70 is guided in a straight line along the guide grooves 66 inside of the body 16.

The knuckle joint 70 is formed by a knuckle block 72, having bifurcated parts branching substantially in parallel and separated a given distance from each other, and a knuckle pin 74, which is inserted through holes formed in the bifurcated parts. A toggle link mechanism 76, by which linear motion of the piston rod 54 is converted into rotational motion of the arm 22, is also disposed in connection with the knuckle joint 70.

Further, a pair of release projections 78*a*, 78*b* are disposed projecting upwardly from the bifurcated parts of the knuckle block 72. The release projections 78*a*, 78*b* are disposed so as to project a predetermined length from substantially elongate openings 80, which are formed in an upper part of the first and second casings 12, 14, when the arm 22 clamps the workpiece (see FIG. 1).

On the other hand, a T-shaped engaging groove 84, which engages with a projection 82 disposed on an end of the connection block 68, is formed on a lower portion of the knuckle block 72. With the engagement between the projection 82 and the engaging groove 84, the piston rod 54 and the knuckle block 72 are connected together through the connection block 68.

The toggle link mechanism 76 includes a link plate 86 connected between the bifurcated parts of the knuckle joint 70 through the knuckle pin 74, and a support lever 90, which is rotatably and axially supported, respectively, by openings 88 formed in the first and second casings 12, 14.

The link plate 86 is installed between the knuckle joint 70 and the support lever 90, and performs a function of linking the knuckle joint 70 and the support lever 90 together. A pair of holes is formed, the holes being separated a predetermined distance, in the link plate 86. The other end of the piston rod 54 is connected to the link plate 86 via the knuckle pin 74 axially supported in one of the holes and the knuckle joint 70, whereas the support lever 90 is connected to the link plate 86 via the link pin 91, which is axially supported in the other hole.

The support lever 90 includes a bifurcated support member 92 in which the link pin 91 is axially supported, a pair of bearings 20 projecting substantially perpendicularly from the axis of the piston rod 54, and which are exposed to the exterior of the body 16 through the openings 88, a pair of circumferential members 94 disposed respectively between the support member 92 and the bearings 20 and fitted respectively into the openings 88 of the body 16, and a pair of arcuate projections 96, which project slightly toward sides of the bearings 20 from the side surfaces of the circumferential members 94. The arm 22, which clamps an unillustrated workpiece, is detachably installed onto the bearings 20 (refer to the two-dot-and-dash line shown in FIG. 1).

In addition, the support lever 90 is provided so as to be rotatable integrally with the arm 22, while the arcuate projections 96 of the support lever 90 function as stoppers, which stop rotation of the arm through abutment against a pair of plates (not shown) fixed to the body 16.

More specifically, linear motion of the piston rod 54 is transmitted to the support lever 90 through the knuckle joint 70 and the link plate 86, such that the support lever 90 is rotationally displaced through a predetermined angle only (in the directions of the arrows C1, C2 shown in FIG. 3), taking as a center the circumferential members 94 supported within the openings 88 of the body 16, whereby the arm 22, which is installed on the support lever 90, is rotated.

On the other hand, cover members 98 are installed on side surfaces of the first casing 12 and the second casing 14, facing the openings 88 in which the bearings 20 of the support lever 90 are inserted. Insertion holes 100, through which the bearings 20 are inserted, form openings in the cover members 98. Seal members 102 lined with a resilient material such as rubber or the like, for example, are installed in the insertion holes 100. The circumferential members 94 of the support lever 90 are sealed by the seal members 102, whereby entry of water, spatter or the like inside the cover members 98 is prevented.

Furthermore, a guide roller 104 is disposed rotatably inside the first and second casings 12, 14 in cavities on an upper side thereof in the vicinity of the toggle link mechanism 76. The guide roller 104 is supported axially and rotatably via a pin member 106. Plural needle bearings 108 are installed in the interior of the guide roller 104, along a circumferential direction thereof. That is, the guide roller 104 is disposed in a manner such that the guide roller 104 rotates smoothly when the needle bearings 108 are rolling. In addition, as the link plate 86 that makes up the toggle link mechanism 76 rotates with its curved surface contacting the guide roller 104, the guide roller 104 is rotatably displaced.

Further, a top cover 110 covering the release projections 78*a*, 78*b* is disposed rotatably on a top part of the body 16. The top cover 110 is made of a metal material, such as stainless steel or the like. In addition, when the release projections 78*a*, 78*b* are operated, the top cover 110 is rotatably displaced with respect to the body 16, exposing the release projections 78*a*, 78*b* to the outside. On the other hand, in the case that the release projections 78*a*, 78*b* are not operated, the top part that includes the release projections 78*a*, 78*b* projecting from the openings 80 is completely covered and enclosed by the top cover 110.

Figure 4:
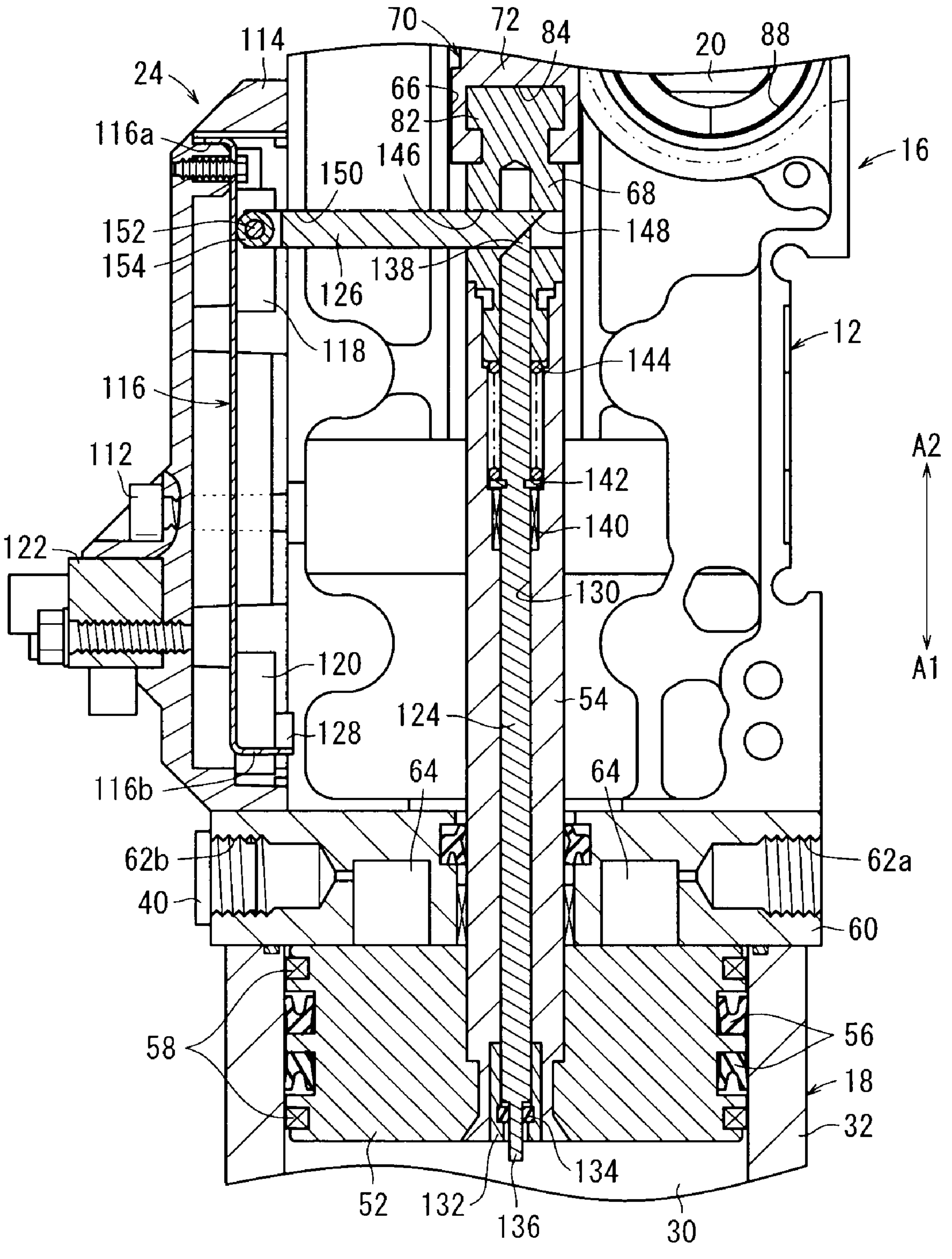
FIG. 4 is an expanded sectional view showing a vicinity of the detection mechanism in the clamp apparatus of FIG. 3.
Figure 5:
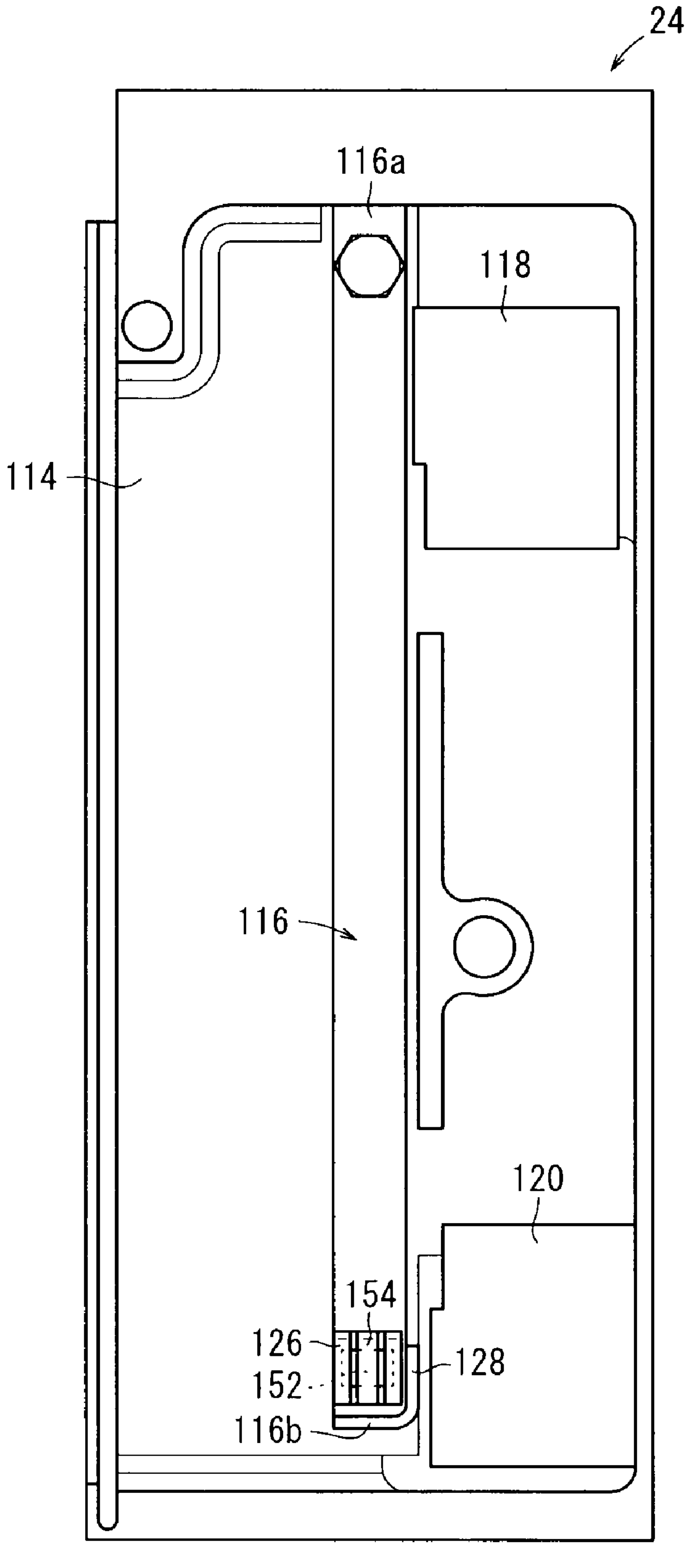
FIG. 5 is an expanded front elevational view of a detection mechanism, in which a switch holder constituting the detection mechanism is seen from a side of the body.

The detection mechanism 24, as shown in FIGS. 3 through 5, includes a switch holder 114 installed on an outer wall surface of the body 16 through a screw 112, a tiltable plate (detection plate) 116 disposed inside the switch holder 114 so as to be tiltable through a predetermined angle, a pair of first and second detection switches (sensors) 118, 120 which detect a rotation amount of the arm 22 based on a tilting displacement of the tiltable plate 116, a connector 122 that externally outputs detection signals from the first and second detection switches 118, 120, a push rod (first rod) 124 inserted displaceably through an interior of the piston rod 54, and a slide rod (second rod) 126, which is displaced substantially horizontally under displacement of the push rod 124 and which presses against the tiltable plate 116.

The tiltable plate 116 is formed by a plate spring having a predetermined thickness, which is arranged substantially in parallel with the piston rod 54, wherein one end 116*a* thereof is disposed upwardly. In addition, the tiltable plate 116 extends vertically downward (in the direction of the arrow A1) from the one end 116*a*. With the one end 116*a* supported by the switch holder 114 serving as a fulcrum, the other end 116*b* thereof is disposed so as to be tiltably displaceable through a given angle in a direction separating away from the body 16 (in the direction of the arrow B1).

Further, the one end 116*a* of the tiltable plate 116 is bent in an L shape toward the direction of separation (the direction of the arrow B1) from the body 16, and is connected to the switch holder 114 by a bolt. On the other hand, the other end 116*b* of the tiltable plate 116 is bent toward the body 16 (in the direction of the arrow B2), in a direction opposite to that of the one end 116*a*.

Furthermore, when the other end 116*b* of the tiltable plate 116 is tilted in the direction of separation (the direction of the arrow B1) from the body 16, with the one end 116*a* acting as a fulcrum, the other end 116*b* is directed vertically downward (in the direction of the arrow A1) and has a resilient force that urges the tiltable plate 116 so as to be restored to a position substantially parallel with the piston rod 54, whereby the tiltable plate 116 is maintained oriented along the vertical direction by the resilient force.

A detection terminal 128 facing toward a side of the proximately arranged second detection switch 120 is disposed at the other end 116*b* of the tiltable plate 116. The detection terminal 128 is bent substantially at a right angle with respect to the other end 116*b*, so as to lie substantially parallel with the side surface of the second detection switch 120. Further, the detection terminal 128, at a state in which the tiltable plate 116 is not tilted, is arranged so as to be separated toward the body 16 (in the direction of the arrow B2) without confronting the side surface of the second detection switch 120 (see FIG. 4). That is, in the event that the tiltable plate 116 is not tilted, the detection terminal 128 is not detected by the second detection switch 120.

The length of the tiltable plate 116 is made longer than the maximum displacement amount (maximum stroke distance) along the axial direction of the piston 52. As a result, the slide rod 126, which is displaced together with the piston 52, normally confronts the tiltable plate 116.

The first and second detection switches 118, 120, for example, employ a change in impedance generated under an approaching action of metallic bodies, and thus are formed as proximity switches, which are capable of detecting positions of the metallic bodies. The first and second detection switches 118, 120 are arranged so as to be separated by a predetermined distance along the vertical direction inside the switch holder 114.

More specifically, as shown in FIG. 5, the first and second detection switches 118, 120 are disposed substantially in parallel while being separated by a predetermined distance on a side of the tiltable plate 116. The first detection switch 118 is arranged at a position in the vicinity of one end 116*a* of the tiltable plate 116, whereas the second detection switch 120 is arranged at a position in the vicinity of the other end 116*b* of the tiltable plate 116.

More specifically, as a result of the slide rod 126 making up the detection mechanism 24 being displaced, whereupon the end thereof approaches the first detection switch 118, the slide rod 126 is detected by the first detection switch 118. Further, the tiltable plate 116 is pressed and tilted by displacement of the slide rod 126, and as a result of the detection terminal 128 thereof becoming adjacent to the second detection switch 120, the tiltable plate 116 is detected by the second detection switch 120.

The first and second detection switches 118, 120 are connected respectively to the connector 122 via unillustrated lead wires, wherein detection signals from the first and second detection switches 118, 120 are output respectively to an unillustrated external device (e.g., a controller or the like) through the connector 122. As a result thereof, a desired control is performed in the external device based on the detection signals.

A push rod 124 is inserted through a first rod hole 130 formed along the axial direction in central portions of the piston rod 54 and the connection block 68. The first rod hole 130 has one end thereof open on a side of the end block 34 (in the direction of the arrow A1). A cylindrical bush 132 is installed in the one end of the first rod hole 130, supporting the push rod 124 displaceably along the axial direction, wherein an airtight condition of the first rod hole 130 communicating with the cylinder chamber 30 is maintained through a seal member 134 installed on an inner circumferential surface of the bush 132. That is, the pressure fluid supplied to the cylinder chamber 30 does not flow into the first rod hole 130 and leak out to the inside of the body 16.

The push rod 124 is an axial body with a substantially uniform diameter, having a protrusion 136 that projects from one end thereof facing the adjustment bolt 44 and which is reduced in diameter radially inwardly, and a first inclined part 138 formed at the other end thereof that engages with the slide rod 126.

The protrusion 136 is formed so as to be capable of abutment against the stopper pin 50 of the adjustment bolt 44 when the push rod 124 is displaced together with the piston 52. On the other hand, the first inclined part 138 is inclined at a predetermined angle (e.g., 450) with respect to the axis of the push rod 124, and further, is formed so as to face toward the slide rod 126 (in the direction of the arrow B1).

Further, the push rod 124 is guided along the axial direction by a bush 140 installed in the first rod hole 130. A return spring (resilient member) 144 is installed between a spring seat 142 that engages with an outer circumferential surface of the push rod 124 and an end surface of the connection block 68. In addition, the push rod 124 is normally urged toward the adjustment bolt 44 (in the direction of the arrow A1) by the resilient force of the return spring 144, and further wherein displacement of the push rod 124 toward the adjustment bolt 44 (in the direction of the arrow A1) is regulated by engagement of the spring seat 142 with a stepped portion of the first rod hole 130. Owing thereto, the spring seat 142 functions as a stopper, whereby the push rod 124 is prevented from dropping out from the piston rod 54.

Furthermore, the protrusion 136 of the push rod 124 projects slightly from the lower end surface of the piston 52 and the piston rod 54 under a resilient action of the return spring 144 (see FIGS. 3 and 4), wherein under displacement of the piston 52, the protrusion 136 abuts against the stopper pin 50. As a result thereof, the push rod 124 is pushed upwardly (in the direction of the arrow A2) in opposition to the resilient force of the return spring 144 (see FIG. 6).

The slide rod 126 is formed with a substantially non-circular cross-sectional shape, with a portion thereof being inserted displaceably through a second rod hole 146 of the connection block 68, which is substantially perpendicular to the first rod hole 130, such that the slide rod 126 is displaceable together with the piston rod 54. The second rod hole 146 extends substantially horizontally, perpendicular to the axis of the connection block 68, and is formed with a cross-sectional shape corresponding to that of the slide rod 126. Owing thereto, the slide rod 126 is regulated against rotational displacement with respect to the second rod hole 146, while being displaceable in the axial direction (the direction of arrows B1 and B2) of the slide rod 126.

One end of the slide rod 126 is inserted into the second rod hole 146 and has a second inclined part 148, which is engaged with respect to the first inclined part 138 of the push rod 124. The second inclined part 148 is inclined at a given angle (e.g., 450) with respect to the axis of the slide rod 126, and further, is formed so as to face toward the push rod 124 (in the direction of the arrow B2). That is, the second inclined part 148 is engaged through abutment with the first inclined part 138 of the push rod 124 so that, for example, when the push rod 124 is displaced toward the body 16 (in the direction of the arrow A2) the second inclined part 148 is displaced with respect to the first inclined part 138, and under an engagement action therebetween, the slide rod 126 is displaced in a direction away from the piston rod 54 (in the direction of the arrow B1). In this manner, the push rod 124 is displaced relatively with respect to the piston rod 54. More specifically, the push rod 124 is displaced together with the piston rod 54, and moreover, when the protrusion 136 abuts against the stopper pin 50, the push rod 124 is displaced relatively with respect to the piston rod 54.

Stated otherwise, the first and second inclined parts 138, 148 function as a conversion mechanism, which is capable of relatively converting the vertically directed displacement (in the direction of arrows A1 and A2) of the push rod 124 into a horizontally directed displacement (in the direction of arrows B1 and B2) of the slide rod 126.

The other end of the slide rod 126 is inserted through the interior of the switch holder 114 a predetermined length via a longitudinal groove 150 formed in a side surface of the body 16. The slide rod 126 is displaced along the longitudinal groove 150 under a displacement action of the piston 52. Further, a roller 154 is rotatably installed through a pin 152 supported substantially perpendicularly to the axis of the slide rod 126, such that the roller 154 normally abuts against a side surface of the tiltable plate 116. That is, the other end of the slide rod 126 normally abuts against the tiltable plate 116 through the roller 154.

As a result, the slide rod 126 normally is pressed toward the side of the piston rod 54 (in the direction of the arrow B2) by the resilient force of the tiltable plate 116 when abutted against the tiltable plate 116.

Furthermore, because the other end of the slide rod 126 abuts against the tiltable plate 116 through the roller 154, in the event that the slide rod 126 is displaced along the tiltable plate 116 under a displacement action of the piston rod 54, such displacement takes place while the roller 154 rotates. Owing thereto, contact resistance is lessened between the slide rod 126 and the tiltable plate 116, such that the slide rod 126 can be smoothly displaced, while the tiltable plate 116 normally presses suitably thereagainst.

In this manner, when the piston 52 is displaced toward the side of the body 16 (in the direction of the arrow A2), the slide rod 126 that makes up the detection mechanism 24 is displaced upwardly together with the piston rod 54 and the connection block 68, and the other end supporting the roller 154 is detected as a result of its becoming adjacent to the first detection switch 118, which is arranged on the upper side of the switch holder 114.

On the other hand, in the event that the piston 52 is displaced to separate away from the body 16 (in the direction of the arrow A1), under an abutment action against the stopper pin 50 of the adjustment bolt 44, the push rod 124 is pressed upwardly (in the direction of the arrow A2) toward the side of the body 16, whereupon the slide rod 126, which engages with the push rod 124, is displaced toward the tiltable plate 116 (in the direction of the arrow B1). As a result, the tiltable plate 116 is tilted, and the detection terminal 128 is detected as a result of its becoming adjacent with respect to the second detection switch 120.

The clamp apparatus 10 in accordance with the embodiment of the present invention is basically constructed as described above. Next, operations and effects of the clamp apparatus 10 shall be explained.

First, the clamp apparatus 10 is fixed in a predetermined position by means of an unillustrated fixing mechanism, and tubes (not shown) or the like connected to a pressure fluid supply source are connected respectively to the first and second fluid inlet/outlet ports 36*a*, 36*b*, 62*a*, 62*b*. In FIGS. 3 and 4, the clamp apparatus 10 is shown as being in a clamped state, whereas in FIGS. 6 and 7, the clamp apparatus 10 is shown as being in an unclamped state. In the following descriptions, the clamped state of FIG. 3 shall be assumed to be an initial condition.

In the initial state of the clamp apparatus 10 as shown in FIG. 3, a pressure fluid is supplied to the second inlet/outlet port 62*a* from an unillustrated pressure fluid supply source, and the pressure fluid is directed into the cylinder chamber 30 through the communication passage 64. Under an action of the pressure fluid delivered into the cylinder chamber 30, the piston 52 is pressed in a direction (the direction of the arrow A1) to separate away from the body 16, and the piston 52 is lowered along the cylinder chamber 30. Further, the knuckle block 72 is slidably displaced, while being guided by the guide groove 66, under a displacement action of the piston 52 and the piston rod 54. During this time, the roller 154, which is disposed on an end of the slide rod 126, the other end of which is inserted through the connection block 68, is displaced downwardly together with the piston 52 and the piston rod 54 while remaining in a state of abutment against the tiltable plate 116.

Linear movement of the piston 52 is transmitted to the toggle link mechanism 76 through the piston rod 54 and the knuckle joint 70, and the linear movement of the piston 52 is converted into rotational motion of the arm 22 by rotation of the support lever 90 making up the toggle link mechanism 76. More specifically, as a result of linear movement of the piston 52, a pulling force is effected, which pulls downwardly (in the direction of the arrow A1) on the knuckle joint 70 and the link plate 86 that are connected to the piston rod 54.

In addition, the pulling force with respect to the link plate 86 causes a predetermined angular rotation of the link plate 86, with the knuckle pin 74 acting as a fulcrum. Along therewith, the support lever 90, linked to the link plate 86, is rotated counterclockwise (in the direction of the arrow C1). Further, by rotation of the arm 22 through a predetermined angle, with the bearing 20 of the support lever 90 acting as a fulcrum, the arcuate projections 96 are rotated a predetermined angle integrally with the support lever 90.

Operating in this way, as the arm 22 rotates, curved surfaces of the link plate 86 contact the guide roller 104, and while maintaining a state of contact with the curved surfaces, the guide roller 104 is rotated clockwise about the center of the pin member 106. In addition, as a result of the arm 22 being rotated in a direction (the direction of the arrow C1) to separate away from the workpiece (not shown), and the piston 52 abutting against the damper 48 of the adjustment bolt 44 that is screw-fitted into the end block 34, further displacement of the piston 52 is regulated, whereby rotational displacement of the arm 22 through the piston rod 54 and the toggle link mechanism 76 is halted (see FIG. 6). As a result, as shown in FIG. 6, the arm 22 is brought into an unclamped state, in which the arm 22 is turned counterclockwise (in the direction of the arrow C1) from the clamped state and rotated through a predetermined angle θ1.

At this time, along with the piston 52 abutting against the damper 48, the protrusion 136 of the push rod 124 that is inserted through the piston rod 54 abuts against the stopper pin 50, and the push rod 124 is displaced toward the side of the body 16 (the direction of the arrow A2) in opposition to the resilient force of the return spring 144. In addition, the second inclined part 148 of the slide rod 126, which is engaged with the first inclined part 138 of the push rod 124, is slidably displaced under an abutment action with the first inclined part 138, whereby the slide rod 126 is pressed toward the side of the detection mechanism 24, and the slide rod 126 is displaced substantially horizontally along the second rod hole 146 in a direction that separates away from the body 16.

Figure 7:
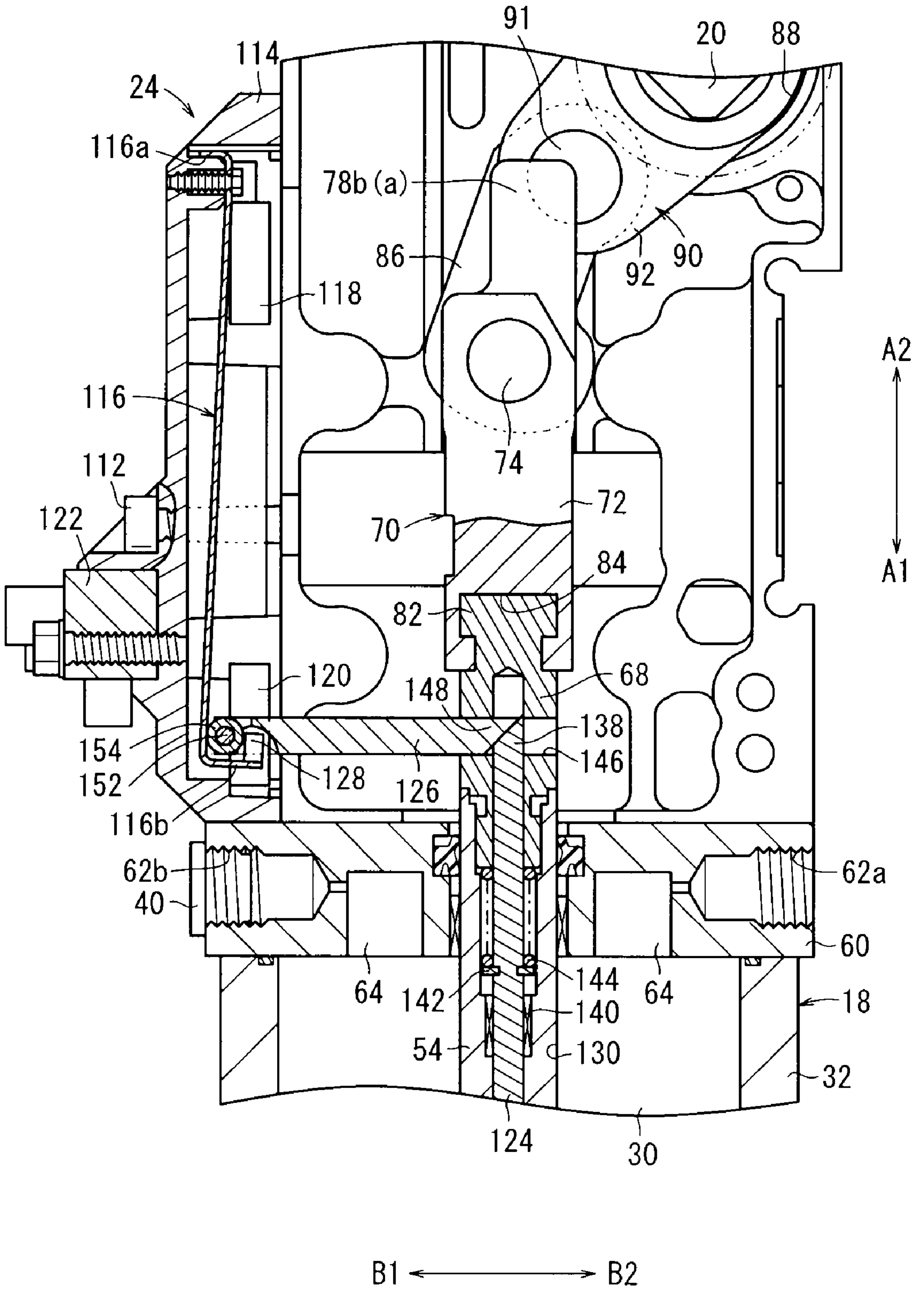
FIG. 7 is an expanded sectional view showing a vicinity of the detection mechanism in the clamp apparatus of FIG. 6.

As a result thereof, through the roller 154 of the slide rod 126, the other end 116*b* of the tiltable plate 116 is pressed and tilted in a direction (the direction of the arrow B1) away from the body 16, and the detection terminal 128 of the tiltable plate 116 approaches the second detection switch 120 where it is detected (see FIG. 7). As a result, the fact that the arm 22 has been rotatably displaced a predetermined angle and an unclamped state has occurred is detected by the detection mechanism 24. That is, the second detection switch 120 detects the detection terminal 128 when the tiltable plate 116 tilts, whereby the unclamped state of the arm 22 is confirmed.

Figure 6:
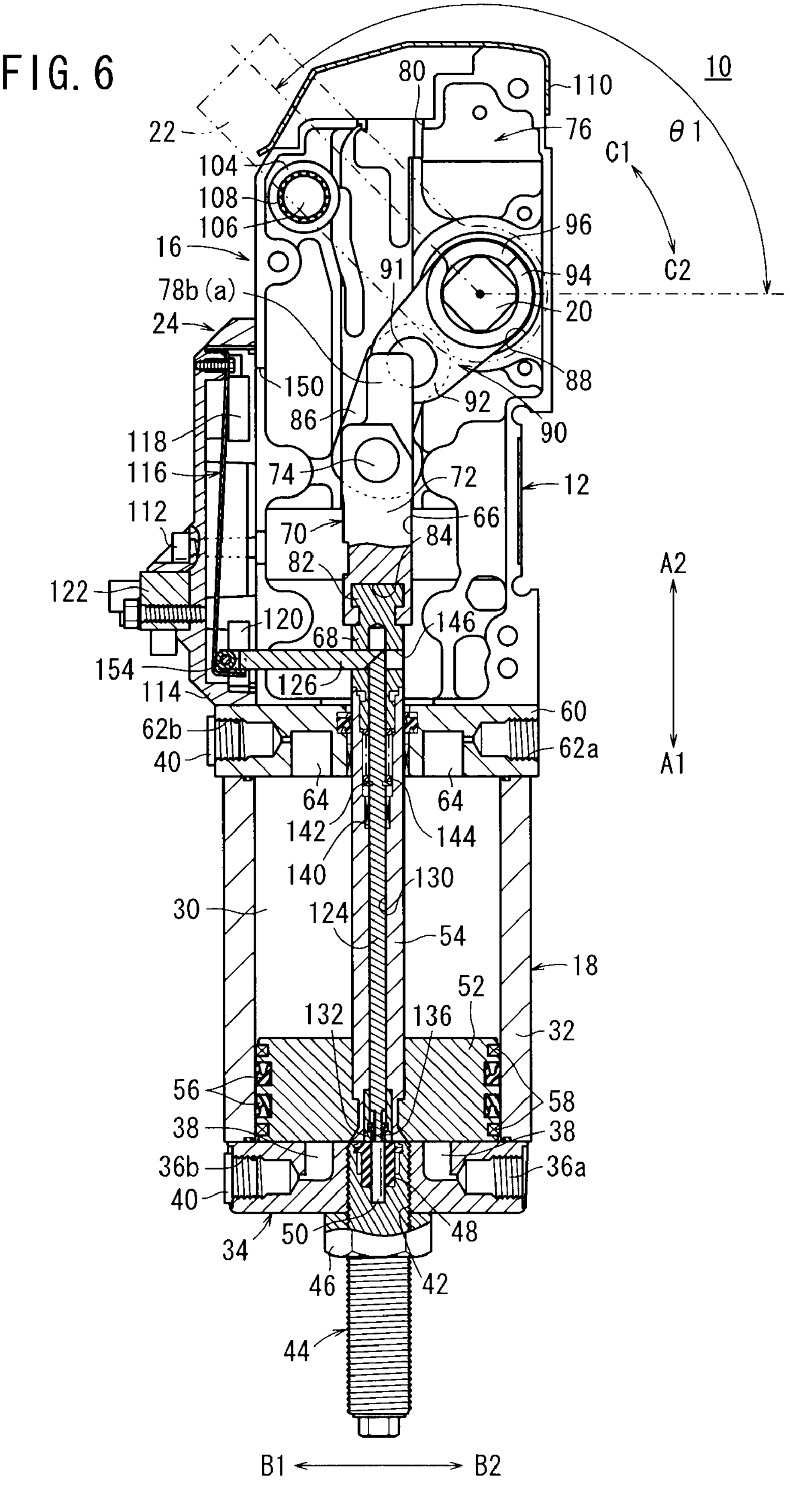
FIG. 6 is a vertical sectional view, with partial omission, showing an arm of the clamp apparatus shown in FIG. 3, as turned through a predetermined angle in an unclamped state.

On the other hand, from the unclamped state shown in FIG. 6 and from switching of an unillustrated directional control valve, the piston 52 is displaced toward the body 16 (in the direction of the arrow A2) as a result of supplying a pressure fluid to the first inlet/outlet port 36*a*. In addition, through displacement of the piston rod 54 together with the piston 52 toward the body 16, the support lever 90 is rotated in an opposite direction (in the direction of the arrow C2) through the link plate 86 that makes up the toggle link mechanism 76, and along therewith, the arm 22 is rotated toward an unillustrated workpiece. At this time, the roller 154, which is disposed on an end of the slide rod 126 inserted through the connection block 68, is displaced upwardly, together with the piston 52 and the piston rod 54, while maintaining its state of abutment against the tiltable plate 116.

Further, as for the push rod 124 that makes up the detection mechanism 24, the protrusion 136 of the push rod 124 separates away from the stopper pin 50 as a result of displacement of the piston 52 toward the side of the body 16, and the push rod 124 once again is displaced toward the end block 34 (in the direction of the arrow A1) owing to the resilient force of the return spring 144. Along therewith, the slide rod 126, which is engaged with the first inclined part 138, is pressed toward the body 16 (in the direction of the arrow B2) by the resilient force from the tiltable plate 116, and is displaced along the second rod hole 146. Moreover, the slide rod 126 is displaced concurrently with displacement of the push rod 124, while maintaining the state of abutment of the second inclined part 148 with respect to the first inclined part 138 of the push rod 124.

That is, together with the displacement of the push rod 124 in the vertical direction, the slide rod 126 is displaced in the horizontal direction.

At this time, as a result of displacement of the slide rod 126 toward the body 16, under the resiliency of the tiltable plate 116 that is pressed by the slide rod 126, the other end 116*b* thereof is tilted gradually toward the side of the body 16, and the other end 116*b* is restored to a state where it is positioned vertically (in the direction of the arrow A1) with respect to the one end 116*a*.

Furthermore, the arm 22 is rotated clockwise (in the direction of the arrow C2), and by abutment of the arcuate projections 96 against plates (not shown) affixed to the body 16, rotational movement of the arm 22 is halted. As a result, a clamped state occurs wherein the workpiece is clamped by the arm 22 (see FIG. 3). Further, after rotation of the arm 22 is halted and a clamped state is obtained, the piston 52 and the piston rod 54 are raised just slightly, so that the piston 52 and the piston rod 54 are stopped by abutment of the piston 52 against the inner wall surface of the body 16.

Further, under an upward displacement action of the piston 52, and as a result of the end of the slide rod 126 reaching a position where it confronts the first detection switch 118, the end of the slide rod 126 is detected by the first detection switch 118, and the detection mechanism 24 detects that the arm 22 is in a clamped state.

Further, in this case, the pair of release projections 78*a*, 78*b* formed on the upper part of the knuckle block 72 project upwardly a predetermined length through openings 80 in the body 16. Accordingly, an operator, by lifting the top cover 110 and exposing the release projections 78*a*, 78*b*, and displacing the release projections 78*a*, 78*b* downwardly (in the direction of the arrow A1), for example, by hitting them with a plastic hammer (not shown) or the like, can release the clamped state of the clamp apparatus 10, thereby returning the apparatus to an unclamped state.

Figure 8:
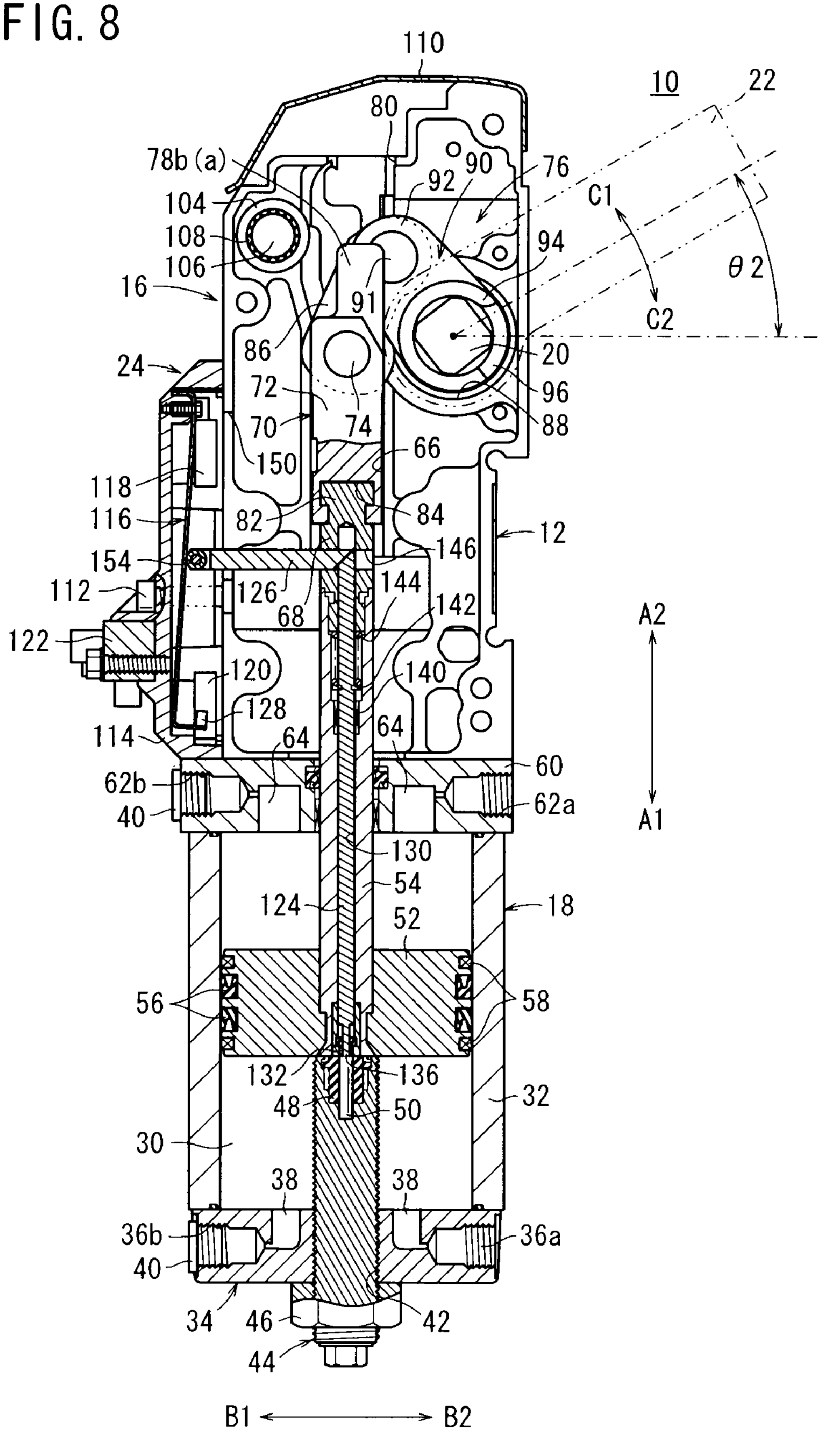
FIG. 8 is a vertical sectional view, with partial omission, showing a state wherein a rotational angle of the arm is adjusted by an adjustment bolt, with respect to the clamp apparatus shown in FIG. 6.

Next, in the aforementioned clamp apparatus 10, a case of adjusting the rotational angle of the arm 22 by the adjustment bolt 44 shall briefly be explained while referring to FIG. 8. In FIG. 8, the clamp apparatus 10 is in an unclamped state.

In the clamp apparatus 10, the adjustment bolt 44 is screw-rotated and is displaced a predetermined length toward the side of the body 16 (in the direction of the arrow A2). In addition, pressure fluid is supplied through the second fluid inlet/outlet port 62*a*, whereby the piston 52, under a pressing action from the pressure fluid, is displaced away from the body 16 (in the direction of the arrow A1). At this time, because the adjustment bolt 44 projects toward and approaches the piston 52 (in the direction of the arrow A2) more so than the position of the adjustment bolt 44 illustrated in FIG. 6, displacement of the piston 52 is regulated in the vicinity of a substantially central portion of the cylinder tube 32 (see FIG. 8). Owing thereto, under a displacement action of the piston 52, the rotational angle θ2 of the arm, when rotated by the toggle link mechanism 76 under a displacement action of the piston 52, is made smaller (θ2<θ1).

In this manner, by displacing the adjustment bolt 44 and changing the distance of the adjustment bolt 44 with respect to the piston 52, it is possible to adjust the rotational angle of the arm 22, which is rotationally displaced in accordance with displacement of the piston 52. Further, in an opposite manner to that just stated, by setting a larger distance between the adjustment bolt 44 and the piston 52, a greater rotational angle of the arm 22 can be assured.

As described above, in the embodiment of the present invention, the adjustment bolt 44 is screw-rotated in the end block 34 that makes up the cylinder 18 while facing toward the piston 52, and by turning the adjustment bolt 44 and displacing the adjustment bolt 44 in the axial direction (the direction of arrows A1 and A2) so as to approach and separate away from the piston 52, the displacement amount of the piston 52 can freely be adjusted by abutment thereof against the adjustment bolt 44. As a result, the rotational angle of the arm 22, which is rotationally displaced through the piston rod 54, the knuckle joint 70 and the toggle link mechanism 76 under a displacement action of the piston 52, can be set to a desired amount.

In this manner, by means of a simple operation of threading the adjustment bolt 44 that projects outwardly from the end block 34, without dismantling the clamp apparatus 10, the rotational angle of the arm 22 can easily and effectively be adjusted from the exterior of the clamp apparatus 10.

Further, an operator can perform the adjustment operation while confirming the rotational angle of the arm 22.

Moreover, after adjusting the rotational angle of the arm 22 through the adjustment bolt 44, the lock nut 46, which is screw-engaged with the outer circumferential surface of the adjustment bolt 44 is rotated and abuts against the end block 34, whereby further screw-rotation of the adjustment bolt 44 can be regulated. As a result, mistaken displacements of the adjustment bolt 44 are prevented, and the state in which the rotational angle of the arm 22 has been adjusted can reliably be maintained.

Still further, the tiltable plate 116 is disposed substantially in parallel with the piston rod 54 within the switch holder 114, which makes up the detection mechanism 24, wherein the other end 116*b* of the tiltable plate 116 is tiltable while the one end 116*a* thereof supported by the switch holder 114 acts as a fulcrum.

Further, the first and second detection switches 118, 120, formed by proximity switches, are arranged in the vicinity of the one end 116*a* and the other end 116*b* of the tiltable plate 116. In addition, when the piston 52 is disposed toward the side of the body 16 (in the direction of the arrow A2), the end of the slide rod 126 is detected by its approaching with respect to the first detection switch 118 while in a state of abutment with the tiltable plate 116. At the displacement terminal end position of the piston 52, which is displaced in a direction away from the body 16, under a pressing action of the slide rod 126 by the push rod 124, the slide rod 126 is displaced toward the tiltable plate 116 (in the direction of the arrow B1), and by tilting the tiltable plate 116, the detection terminal 128 thereof approaches and is detected by the second detection switch 120.

In this way, in the event that the piston 52 is disposed upwardly, a clamped state of the clamp apparatus 10 can be confirmed as a result of the detection performed by the first detection switch 118. On the other hand, in the event that the piston 52 is disposed downwardly, an unclamped state of the clamp apparatus 10 can be confirmed as a result of the detection performed by the second detection switch 120.

That is, as a result of the tiltable plate 116 being freely tiltable according to displacement of the slide rod 126, irrespective of the displacement amount of the piston 52 in the axial direction, clamped and unclamped states of the clamp apparatus 10 can reliably and easily be detected by the detection mechanism 24.

Stated otherwise, the aforementioned detection mechanism 24 is capable of detecting both clamped and unclamped states of the clamp apparatus 10 irrespective of the rotational angle of the arm 22 as adjusted by the adjustment bolt 44. Moreover, it is unnecessary to perform adjustments and replacement operations each time corresponding to changes in the rotational angle, and the clamped and unclamped states can be detected by a single detection mechanism 24.

The clamp apparatus according to the present invention is not limited to the aforementioned embodiment, and naturally various other configurations could be adopted without deviating from the essence or gist of the present invention.

The invention claimed is:

1. A clamp apparatus in which linear movement of a cylinder is converted to rotational movement by a toggle mechanism, for clamping a workpiece through a clamp arm, the clamp apparatus comprising:

a main body;

a cylinder connected to said main body and having a piston therein displaceable in an axial direction under pressure of a pressure fluid;

an adjustment mechanism disposed so as to be displaceable within said cylinder, said adjustment mechanism having an adjustment bolt which is capable of regulating displacement of said piston and of adjusting a stroke displacement amount of said piston, said adjustment mechanism being capable of adjusting an operating angle of a clamp arm based on the stroke displacement amount of said piston;

a detection mechanism for detecting clamped and unclamped states of the workpiece based on the stroke displacement amount of said piston, irrespective of a rotational angle of said clamp arm;

a first rod disposed displaceably inside a piston rod connected to said piston, said first rod being displaced together with said piston rod, and further wherein said first rod is biased toward a side of said adjustment mechanism under a resilient action of a resilient member;

a second rod substantially perpendicular to said first rod, which is inserted displaceably inside said piston rod and engages with said first rod;

a detection plate disposed substantially in parallel with said first rod with an end of said second rod abutting thereagainst, said detection plate being tiltably displaceable, with a fixed end thereof serving as a fulcrum, under a displacement action of said second rod and by being pressed by said second rod; and a sensor disposed adjacent to said detection plate, which detects a tilting displacement of said detection plate.

2. The clamp apparatus according to claim 1, wherein a lock nut is screw-engaged with said adjustment bolt for regulating displacement of said adjustment bolt in the axial direction.

3. The clamp apparatus according to claim 1, wherein said first rod comprises a first inclined part inclined at a predetermined angle facing said second rod, and said second rod includes a second inclined part inclined at a predetermined angle facing said first rod, the second inclined part abutting against the first inclined part, wherein a displacement direction of said first rod is transmitted to said second rod perpendicularly thereto through said first and second inclined parts.

4. The clamp apparatus according to claim 3, wherein a roller supported rotatably about an axis thereof is disposed on an end of said second rod, said second rod abutting against said detection plate through said roller.

5. The clamp apparatus according to claim 3, wherein a detection terminal, which confronts said sensor when the detection plate is tiltably displaced, is disposed on another end of said detection plate.

6. The clamp apparatus according to claim 1, wherein said sensor comprises a pair of first and second detectors, disposed respectively facing the one end and another end of said detection plate.

7. The clamp apparatus according to claim 6, wherein said sensor comprises a proximity switch capable of detecting a position of said detection plate using a change in impedance generated under an approaching action of said detection plate.

* * * * *